April 21, 1953
D. M. SMITH
2,635,267
EGG CLEANING MACHINE
Filed July 6, 1948
2 SHEETS—SHEET 1
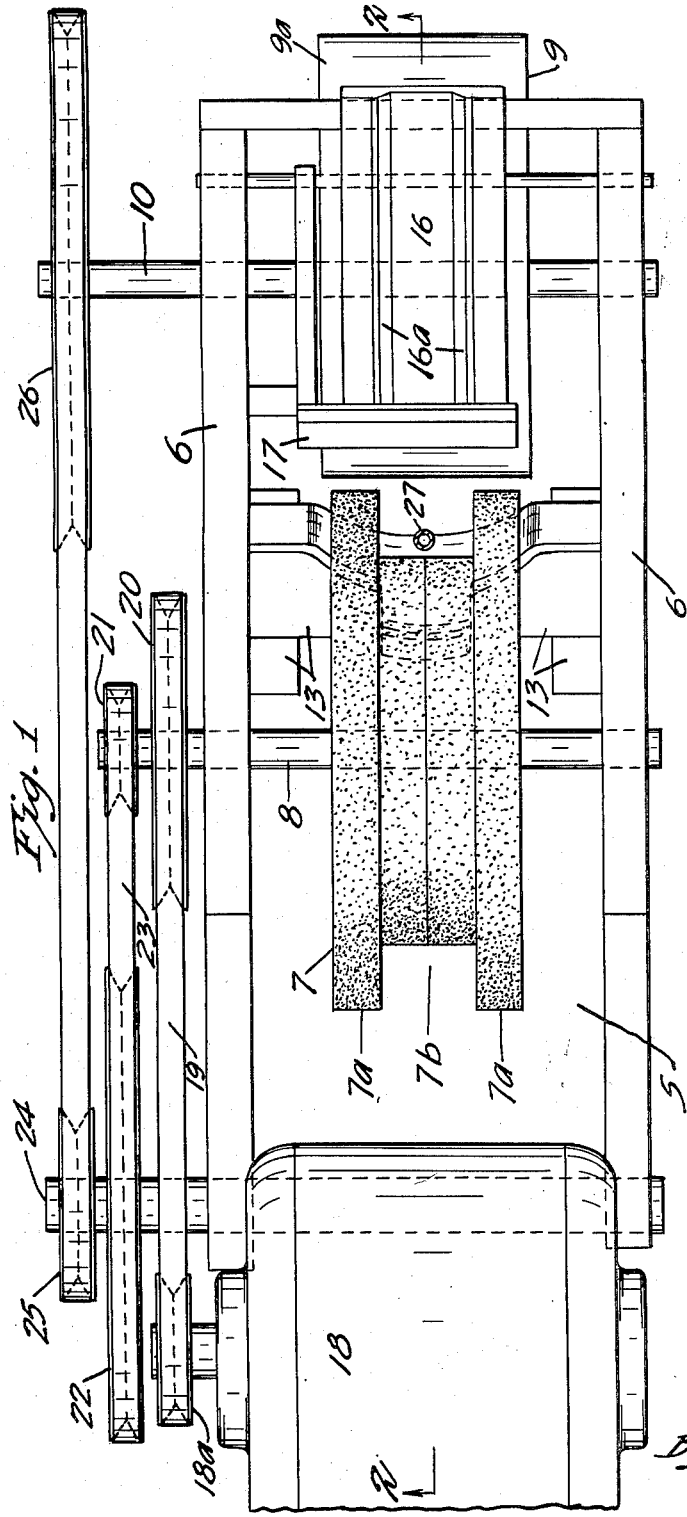
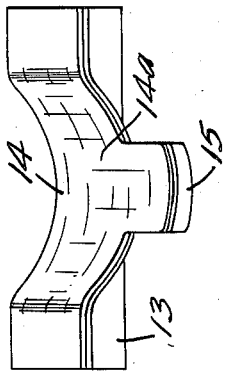
Inventor
Delbert M. Smith
By Williamson + Williamson
Attorneys

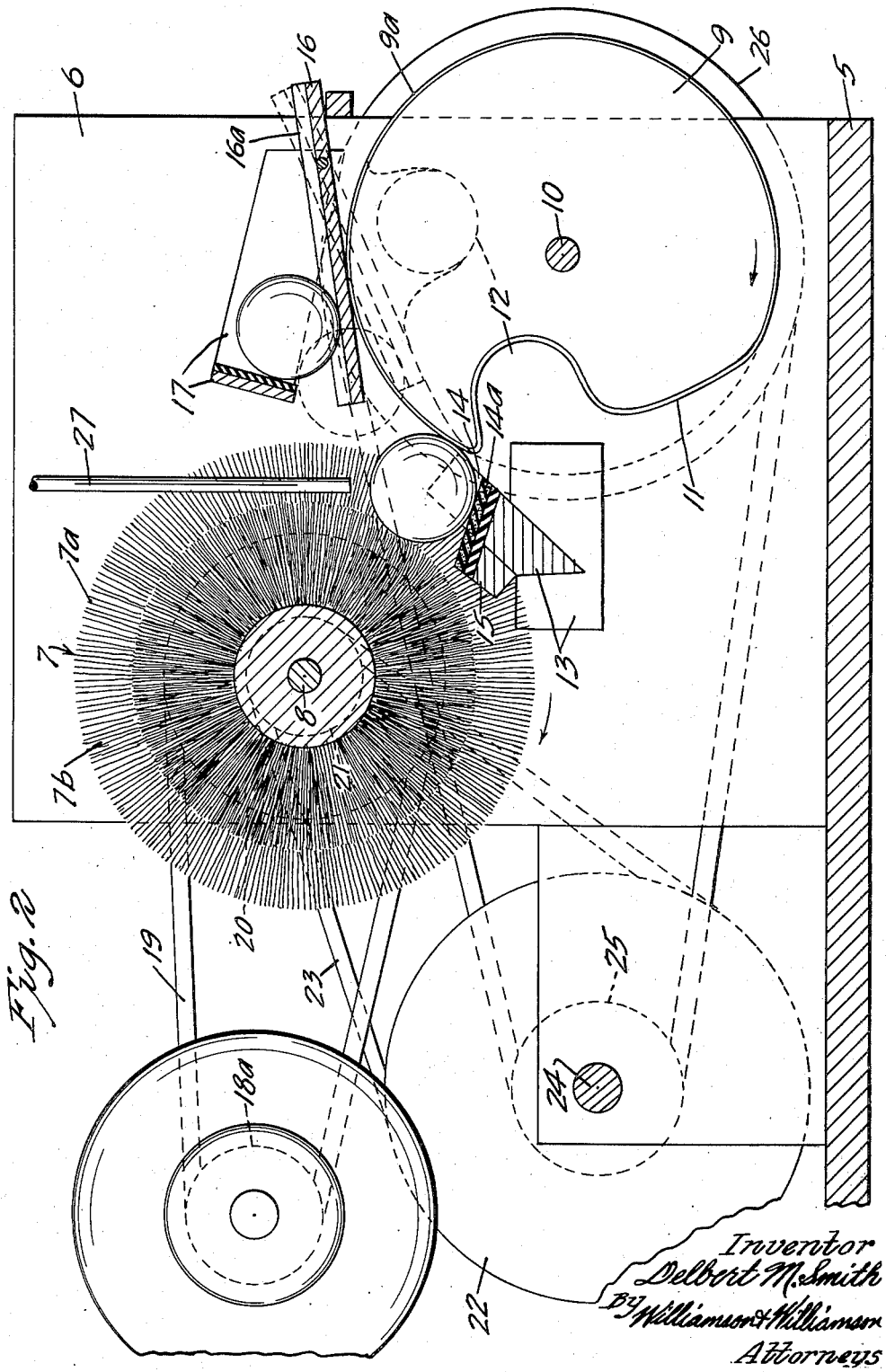

Patented Apr. 21, 1953

2,635,267

UNITED STATES PATENT OFFICE 2,635,267

EGG CLEANING MACHINE

Delbert M. Smith, Morton, Minn.

Application July 6, 1948, Serial No. 37,171

7 Claims. (Cl. 15—3.14)

This invention relates to machines for cleaning eggs and the like.

It has long been a problem to economically and efficiently clean eggs without danger of injuring the air cells or breaking the egg.

It is an object of my invention to provide a novel, highly efficient egg cleaning device designed to carefully handle the eggs without danger of injuring the air cells therein and to effectively clean the outside without damaging the eggs.

It is another object to provide a high speed cleaning device for eggs which successively supplies eggs to the rotary cleaning member and holds the eggs in cleaning position while simultaneously rotating said eggs during the cleaning operation to completely clean the same and thereafter successively discharges said eggs, to a collection location.

More specifically, it is an object to provide a rotary cleaning element having a soft cleaning brush on the outer periphery thereof and a rotary egg driving drum mounted in opposed spaced relation to said cleaning brush, both of said rotary members engaging the outer periphery of the egg during the cleaning operation, said egg rotating drum rotating the egg slowly while the high speed cleaning brushes thoroughly clean the entire surface thereof.

Still more specifically, it is an object to provide a machine for cleaning eggs and the like having a soft rotary cleaning brush with a peripheral groove centrally formed therein to simultaneously clean the end portions and central portion of an egg while exerting substantially equal cleaning pressure on all contacted parts thereof. An egg driving drum is provided to maintain constant contact with said egg during the cleaning operation and to slowly rotate the same, to completely clean said egg, said egg driving element also serving as a cam to operate the feeder mechanism as well as carrying the eggs to a collection location after the cleaning thereof.

It is a further object to provide novel and improved, highly efficient feeder mechanism operating in combination with said egg driving member to successively supply eggs to the cleaning position of said machine.

These and other objects and advantages of my invention will more fully appear from the following description made in connection with the accompanying drawings wherein like reference characters refer to the same or similar parts throughout the several views and in which Fig. 1 is a top plan view of my egg cleaning machine;

Fig. 2 is a central vertical longitudinal sectional view taken substantially along the line 2—2 of Fig. 1; and, Fig. 3 is a top plan view of the egg supporting member in the position in which it is assembled in the machine.

As shown in Figs. 1 and 2, I provide a supporting structure with the base 5 and upstanding sides 6 disposed in spaced substantially parallel relation; a rotary cleaning member 7 is fixed to a shaft 8 journaled in said sides 6. The cleaning member 7 consists in a brush 7a with a central peripheral groove 7b formed therein and mounted in a suitable hub. The brush 7a is formed as from soft highly yieldable wire bristles which are adapted to gently engage the outer surface of an egg. The central peripheral groove 7b engages the central portion of the egg with substantially the same pressure as exerted by the outer portions of the brush on the respective end portions of the egg.

In the form of my invention illustrated, I provide a rotary egg driving member such as the drum 9 fixed on shaft 10 which is journaled in sides 6. The drum 9 is rotated in the direction of the arrow in Fig. 2 and has a flattened portion 11 to provide a feeder actuating camming surface. The forward portion of the flattened camming surface 11 has an egg transferring element mounted thereon which in the form shown constitutes a discharging recess 12 transversely formed therein. In the form of the invention illustrated, the feeder drum has a padded outer surface such as a layer of sheet rubber 9a to protect the eggs and to frictionally engage the same and the drum is disposed in spaced opposed relation to a portion of the lower segment of the cleaning brush 7a.

An egg supporting member 13 is interposed between the cleaning brush 7a and the egg driving drum 9 and is disposed in closely spaced relation to both members, 7 and 9. An elongated egg retaining recess 14 is formed in the top of supporting member 13 and has a substantial amount of padding material such as the sponge rubber 14a attached thereto. The inner portion of egg supporting member 13 is diminished in width to form an inwardly extending projection 15 adapted to project into the groove 7b of the brush 7a. The recessed egg engaging surface 14 slopes outwardly and downwardly toward feeder drum 9 to permit the force of gravity to urge the egg into driving engagement with said drum 9, as best shown in Fig. 2.

A feeder mechanism having the chute 16 and padded feeder stop 17 is provided above the drum 9. In the form illustrated, the inclined egg supply chute 16 is pivoted at its outer portion to the sides 6 and extends inwardly therefrom in downwardly sloping relation and has a pair of spaced parallel egg engaging rails 16a down which the eggs are free to roll on their longitudinal axes. The egg stop 17, in the form illustrated, is fixed between the sides 6 and above the freely swinging inner end of chute 16. The chute 16 rides on the outer periphery of drum 9 and is normally held in closely spaced relation to feeder stop 17 to retain the eggs on the chute.

Suitable driving mechanism is provided including a power source such as the electric motor 18 with the driving pulley 18a mounted thereon. A V-belt 19 is trained about the pulley 18a and about a driven pulley 20 fixed on the shaft 8. The shaft 8 has a second pulley 21 fixed thereon for driving a large idler sheave 22 as by the belt 23. The sheave 22 is fixed to a stub shaft 24 which is journaled on the same side 6 of the machine as pulley 21. A small sheave 25 is also fixed to shaft 24 to be driven thereby and a large drum-driving sheave 26 is fixed to shaft 10 and a belt is trained about sheaves 25 and 26 for driving the same. The idler sheave 22 and mechanism connected therewith is, of course, provided merely to reduce the speed of drum 9 and any other suitable means for obtaining this result could be used.

The following is a description of the operation of my improved egg washing machine. One egg is initially placed on the inclined chute 16 so as to engage padded feeder stop 17 and be retained thereby. The motor 18 is then started to rotate the drum 9 and the brush 7a in the respective directions indicated by the arrows in Fig. 2. The outer periphery of the drum 9 will engage the bottom of chute 16 and normally support the same in upwardly retracted position, however, when the drum 9 is rotated so that the chute 16 rests on the flattened portion 11 of the drum 9, as is shown by the dotted position in Fig. 2, the inner end of the chute 16 will swing downwardly and release the egg disposed thereon. The discharged egg rolls off the chute under the stop 17 and over the portion of the priphery of drum 9 disposed between the inner end of chute 16 and the egg supporting member 13 and comes to rest on the padded recess 14a which slopes downwardly toward the drum 9 and hence, the egg will be maintained in driving contact with the circular frictional peripheral surface of said drum 9 to slowly rotate said egg while the cleaning brush 7a engages the opposite side of the egg and completely cleans the same. When the egg discharging slot 12 is rotated to a position opposite to the egg in cleaning position on the inclined recess 14, the egg will roll into said padded recess 12 and be carried around under chute 16 and the egg will then gently roll out to a suitable collection location such as a tray (not shown) disposed in substantially horizontally opposed relation to said shaft 10. The recess 12, is, of course, deep enough so that the chute 16 will not contact an egg therein.

The speed of rotation of the drum 9 is approximately 30 revolutions per minute and the speed of the cleaning brushes is between 400 and 500 revolutions per minute. To obviate the necessity of soaking the eggs before cleaning, a water supply tube 27 is provided and is disposed in vertically spaced relation above the egg supporting recess 14 and with clearance under said tube 27 for an egg to be supported on member 13. This flow of water serves to loosen the dirt on the egg and completely clean the same.

It will be seen that I have provided a novel and highly efficient egg washing machine which will wash at least 1800 eggs an hour which figure is substantially higher than any conventional machine of comparable cost. It should be noted, that the simplicity of construction of my machine will make it extremely inexpensive to manufacture. The machine has been thoroughly tested and it has been proved that substantially none of the eggs cleaned thereby have been damaged in any way, either by breaking the air cells or by cracking the eggs.

The drum 9 has three cooperating functions during its rotation. First of all, it provides a camming surface which normally holds chute 16 in upwardly retracted position but which intermittently lowers the free end of the chute to successively discharge one egg at a time therefrom onto the padded egg supporting recess 14. Secondly, the drum 9 serves to slowly rotate the egg on its longitudinal axis through approximately three revolutions while the cleaning brush progressively engages the entire outer surface of the egg with substantially uniform pressure to thoroughly clean the same without damaging the egg. Thirdly, the drum 9, with its discharging recess 12, serves to transfer the egg over to a suitable collection location which is in substantially horizontally opposed relation to said shaft 10. This multi-function drum materially simplifies the construction of the machine and increases the efficiency thereof.

It will, of course, be understood, that various changes may be made in the form, details, arrangement and proportions of the parts without departing from the scope of my invention.

What I claim is:

1. A machine for cleaning eggs and the like comprising a supporting structure, an egg cleaning member adapted to move relative to said structure and mounted thereon, a rotary egg driving member journaled on said structure and having its periphery disposed in opposed spaced relation to said egg cleaning member, an egg supporting member mounted on said structure and interposed between said egg cleaning member and said egg driving member, the supporting surface of said egg supporting member and the periphery of said egg driving member forming a cradle for supporting an egg and holding the same against said cleaning member whereby said egg is rotated during the cleaning operation, means for actuating said cleaning member and said driving member, a cam controlled feeder mechanism for successively supplying eggs to said cradle formed by said egg supporting member and said egg driving member, a portion of the periphery of said egg driving member being inset from the general circumference thereof to form the cam for controlling said feeder mechanism.

2. A machine for cleaning eggs and the like comprising a supporting structure, a rotary egg cleaning member journaled on said structure, a rotary egg driving member journaled on said structure and disposed in opposed spaced relation to said egg cleaning member, an egg supporting member interposed between said egg driving member and said egg cleaning member and having its egg supporting surface sloping downwardly toward said egg driving member, an egg feeder mechanism for successively supplying eggs, one at a time, to said egg supporting member; said feeder mechanism including an egg supply chute pivoted at its outer end on said supporting structure and extending inwardly therefrom to ride on said egg driving member which forms an actuating cam therefor and a feeder stop fixed to said supporting structure and disposed above the inner end of said supply chute to normally retain an egg thereon; said egg driving member having a portion of its periphery inset from the general circumference thereof to intermittently lower said supply chute to permit an egg to be discharged therefrom onto said egg supporting member.

3. A machine for cleaning eggs and the like comprising a supporting structure, a soft rotary cleaning member journaled on said structure, a rotary egg driving member journaled on said structure and having the egg engaging portion thereof disposed in opposed spaced relation to said egg cleaning member, an egg supporting member interposed between said driving member and said cleaning member, said egg supporting member sloping outwardly toward said egg driving member to maintain contact between said egg and the periphery of said driving member for positively rotating the same during the cleaning operation, said egg driving member having a recess formed in the periphery thereof to receive said egg after the cleaning thereof and transfer the same to a collection location, a feeder mechanism intermittently actuated by said egg driving member during the rotation thereof for successively feeding eggs to said egg supporting member, and means for driving said cleaning member and said egg driving member.

4. Mechanism for cleaning eggs and the like comprising a supporting structure, an egg cleaning member movably mounted on said structure, a rotary egg driving wheel journaled on said structure and having the egg engaging peripheral surface thereof padded with frictional material to cause rotation of an egg engaged thereagainst on a fixed major axis of the egg, said egg engaging periphery being disposed in spaced relation to said egg cleaning member, an egg supporting member interposed between said driving wheel and said cleaning member and positioned in closely spaced relation to and inclined toward said driving wheel to maintain driving rotational contact thereof with an egg, said cleaning member being positioned to engage the egg while the same is being rotated by said driving wheel, said driving wheel having an egg receiving transfer recess formed in the periphery thereof to receive an egg after a predetermined rotation of said driving wheel and transfer the egg to a collection location, and means for driving said cleaning member and said driving wheel.

5. Mechanism for cleaning eggs and the like comprising a supporting structure, an egg cleaning member mounted on said structure for movement thereon, an egg driving member mounted on said structure in opposed spaced relation to said cleaning member and constructed to permit movement thereof while maintaining a portion thereof in predetermined spaced relation to an opposed portion of said cleaning member during the movement of said two members, an egg supporting member mounted on said structure between the cleaning member and the driving member, the supporting surface of said supporting member being concavely recessed to receive an egg therein and combine with said driving member and cleaning member to define a substantially fixed egg cleaning position, said recess positioning the egg for constant rotation on a substantially fixed major axis of the egg, and said egg driving member having an egg transfer recess formed therein to receive an egg after the egg has been rotated for a predetermined time interval during the cleaning thereof and transfer the cleaned egg to a collection location, the egg supporting member and the recess thereof being inclined toward said egg driving member to maintain contact between the egg and said driving member and for urging the egg into the recess formed in said egg driving member when said recess is moved during the cycle of operation into egg receiving position adjacent said egg cleaning position, and means for driving said egg cleaning member and said egg driving member.

6. Mechanism for cleaning eggs and the like comprising a supporting structure, an egg cleaning member movably mounted on said structure, an egg driving member journaled for rotation on said structure and having a generally cylindrical peripheral portion and disposed in opposed spaced relation to said egg cleaning member, an egg supporting member interposed between said egg driving member and said egg cleaning member and combining with said two members to form an egg cleaning station, said egg supporting member having an egg supporting surface sloping toward said egg driving member and recessed to normally receive an egg therein and combining with said egg driving member to hold said egg for rotation on a substantially stationary major axis thereof during the cleaning operation, said egg driving member having a recess formed in the peripheral surface thereof to receive an egg from said egg cleaning station after the egg has been rotated for a predetermined time interval, rotatation of said egg driving member through a predetermined arc transferring the egg received in said recess from the egg cleaning station to an egg collection location, and means for driving said cleaning member and said driving member.

7. The structure set forth in claim 6 and an egg feeder mechanism for supplying eggs, one at a time, to said egg supporting member, said egg feeder mechanism including an egg supply chute pivoted at its outer end on said supporting structure and extending inwardly thereof to ride on the periphery of said egg driving member which forms an actuating cam therefor, a feeder stop fixed to said supporting structure and disposed above the inner portion of said supply chute to normally retain an egg thereon, said egg driving member having a portion of its periphery inset from the general circular circumference thereof adjacent said egg receiving transfer recess to intermittently lower said supply chute and discharge an egg under said feeder stop onto said egg supporting member.

DELBERT M. SMITH.

References Cited in the file of this patent

UNITED STATES PATENTS

| Number | Name | Date |
|---|---|---|
| 503,210 | Learned | Aug. 15, 1893 |
| 956,426 | Rowland | Apr. 26, 1910 |
| 1,464,775 | Reuter | Aug. 14, 1923 |
| 1,530,415 | Roussel | Mar. 17, 1925 |
| 1,920,960 | Cogsdill | Aug. 8, 1933 |
| 2,119,869 | Paxton | June 7, 1938 |
| 2,378,418 | Lister | June 19, 1945 |